(12) United States Patent
Kawashimo

(10) Patent No.: US 9,754,156 B2
(45) Date of Patent: Sep. 5, 2017

(54) CONTENT OUTPUT APPARATUS, CONTENT OUTPUT METHOD AND RECORDING MEDIUM

(71) Applicant: CASIO COMPUTER CO., LTD., Tokyo (JP)

(72) Inventor: Takashi Kawashimo, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/967,909

(22) Filed: Dec. 14, 2015

(65) Prior Publication Data

US 2016/0259967 A1 Sep. 8, 2016

(30) Foreign Application Priority Data

Mar. 3, 2015 (JP) .................................. 2015-041600

(51) Int. Cl.
```
G06K 9/46      (2006.01)
G06K 9/00      (2006.01)
G06F 3/16      (2006.01)
G06Q 30/02     (2012.01)
G09F 27/00     (2006.01)
H04N 21/43     (2011.01)
H04N 5/445     (2011.01)
```

(52) U.S. Cl.
CPC ......... *G06K 9/00268* (2013.01); *G06F 3/165* (2013.01); *G06K 9/00302* (2013.01); *G06Q 30/0269* (2013.01); *G09F 27/00* (2013.01); *H04N 21/43* (2013.01); *G06K 2009/00322* (2013.01); *G09F 2027/001* (2013.01); *H04N 5/44543* (2013.01)

(58) Field of Classification Search
CPC .... H04N 21/43; H04N 5/44543; G06F 3/165; G06K 2009/00322; G06K 9/00268; G06K 9/00302; G06Q 30/0269; G09F 27/00
See application file for complete search history.

(56) References Cited

U.S. PATENT DOCUMENTS

| | | | |
|---|---|---|---|
| 2008/0037953 A1* | 2/2008 | Kawamura | H04N 5/783 386/343 |
| 2008/0129854 A1* | 6/2008 | Onoda | H04N 1/2145 348/295 |
| 2010/0298959 A1* | 11/2010 | Sekiguchi | G10L 19/022 700/94 |
| 2011/0032372 A1* | 2/2011 | Uemura | G06K 9/00228 348/220.1 |
| 2015/0065175 A1* | 3/2015 | Kokubo | H04W 64/00 455/456.3 |

FOREIGN PATENT DOCUMENTS

| | | | | |
|---|---|---|---|---|
| JP | 08-248969 | * | 9/1996 | ............. G10K 15/04 |
| JP | 2011-150221 A | | 8/2011 | |

* cited by examiner

*Primary Examiner* — Amara Abdi
(74) *Attorney, Agent, or Firm* — Scully, Scott, Murphy & Presser, P.C.

(57) ABSTRACT

A content output apparatus includes: a detector for detecting a user; an extractor for extracting a feature of the user detected by the detector; and a controller for controlling a reproduction speed of content to be output to a display, based on the feature extracted by the extractor.

16 Claims, 5 Drawing Sheets

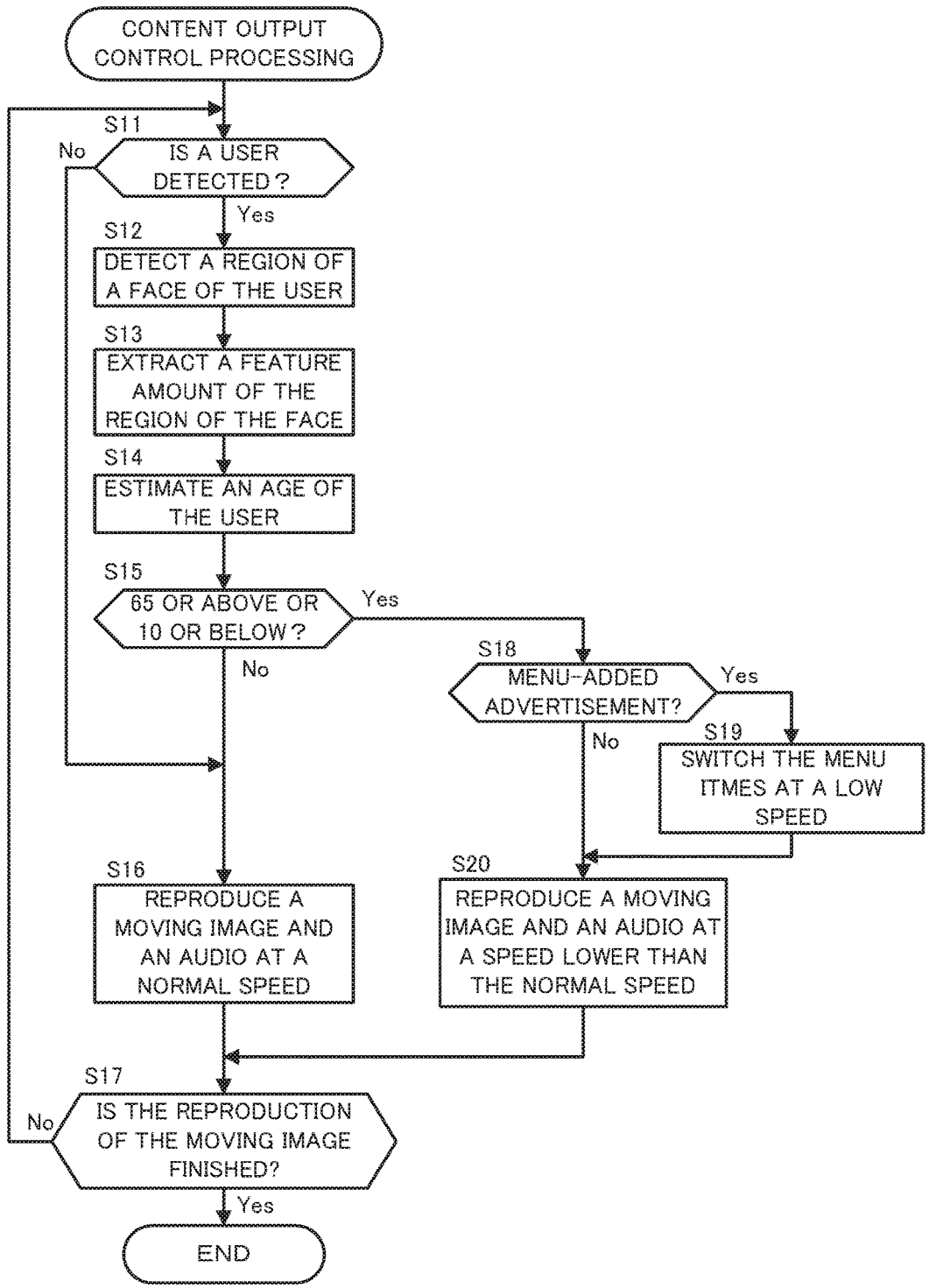

CONTENT OUTPUT APPARATUS, CONTENT OUTPUT METHOD AND RECORDING MEDIUM

CROSS-REFERENCE TO RELATED APPLICATION

This application claims the benefit of Japanese Patent Application No. 2015-041600, filed on Mar. 3, 2015, the entire disclosure of which is incorporated by reference herein.

FIELD

The present disclosure relates to a content output apparatus, a content output method, and a recording medium.

BACKGROUND

Conventionally, advertisement has been widely performed by displaying content (characters, moving images, still images, and the like) on a display or a screen.

For example, Unexamined Japanese Application Kokai Publication No. 2011-150221 discloses a technology to make an enhanced impression on the users, by making the shape of the screen the same as the shape of the content for display and displaying the same-shaped content on the screen (for example, projecting content of a human being onto the screen having the same human-shape).

However, Patent Literature 1 can only distribute one-sided advertisement to the users being the viewer, and does not consider the users' easiness for viewing or listening. Therefore, some users have felt stress because it is hard to view or listen to.

As such, it is desirable to output content to suit to a person who views the content so as not to make the person feel any stress.

The present disclosure is made in view of the above circumstances, and has an exemplary objective of providing a content output apparatus and the like that is preferable for outputting content so as not to make the user being the viewer feel any stress.

SUMMARY

A content output apparatus includes: a detector for detecting a user; an extractor for extracting a feature of the user detected by the detector; and a controller for controlling a reproduction speed of content to be output to a display, based on the feature extracted by the extractor.

BRIEF DESCRIPTION OF THE DRAWINGS

A more complete understanding of this application can be obtained when the following detailed description is considered in conjunction with the following drawings, in which:

FIG. 5 is a diagram showing one example of a flowchart of content output control processing.

DETAILED DESCRIPTION

As follows, an exemplary embodiment of the present disclosure are explained with reference to the drawings.

Figure 1:
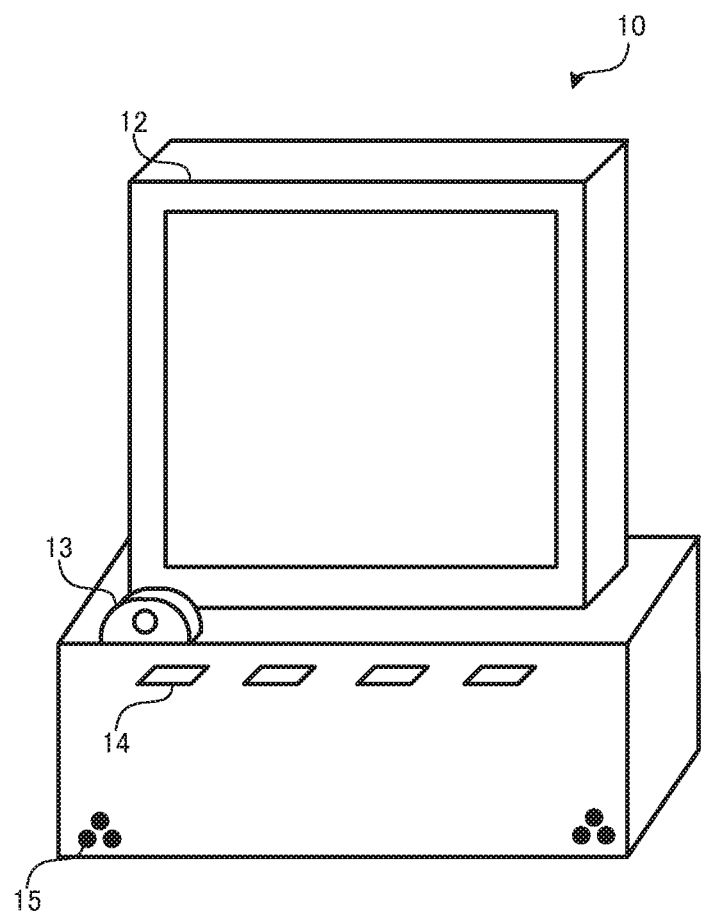
FIG. 1 is a diagram showing an exterior appearance of a content output apparatus according to an exemplary embodiment.

FIG. 1 is a diagram showing an exterior appearance of a content output apparatus according to an exemplary embodiment of the present disclosure.

This content output apparatus 10 is a digital signage (so-called electronic signboard) installed in store fronts, communal facilities, and the like, and outputting content such as guide signs, advertisement, and the like for users being viewers. Such content includes guide information for guiding users or appealing advertisement information, examples of which are still images and moving images. In the present exemplary embodiment, moving images are used in the explanation where necessary.

As shown in FIG. 1, a content output apparatus 10 includes a display 12, a camera 13, HW (hardware) keys 14, and a speaker 15.

The display 12 is, for example, constituted by a LCD (Liquid Crystal Display), an EL (Electroluminescence) display, or the like, and outputs content.

The camera 13 is an image-capturer constituted by an optical element such as a lens and a diaphragm and an image sensor such as CCD (Charge Coupled Device) and CMOS (Complementary Metal Oxide Semiconductor). This camera 13 is installed to incorporate a user viewing the content output apparatus 10 within the angle of view, and captures a user in real time.

Four HW keys 14 are provided on the front surface of a supporting base which supports the display 12, and the HW keys 14 are an operating unit operated by a user. A user can instruct, using these HW keys 14, to the content output apparatus 10, switching of content, starting or stopping of content, and the like.

The speaker 15 is an audio output unit that outputs audio to outside. For example, if the content is an audio-included moving image, the audio of the moving image is output to outside as an audible sound.

Figure 2:
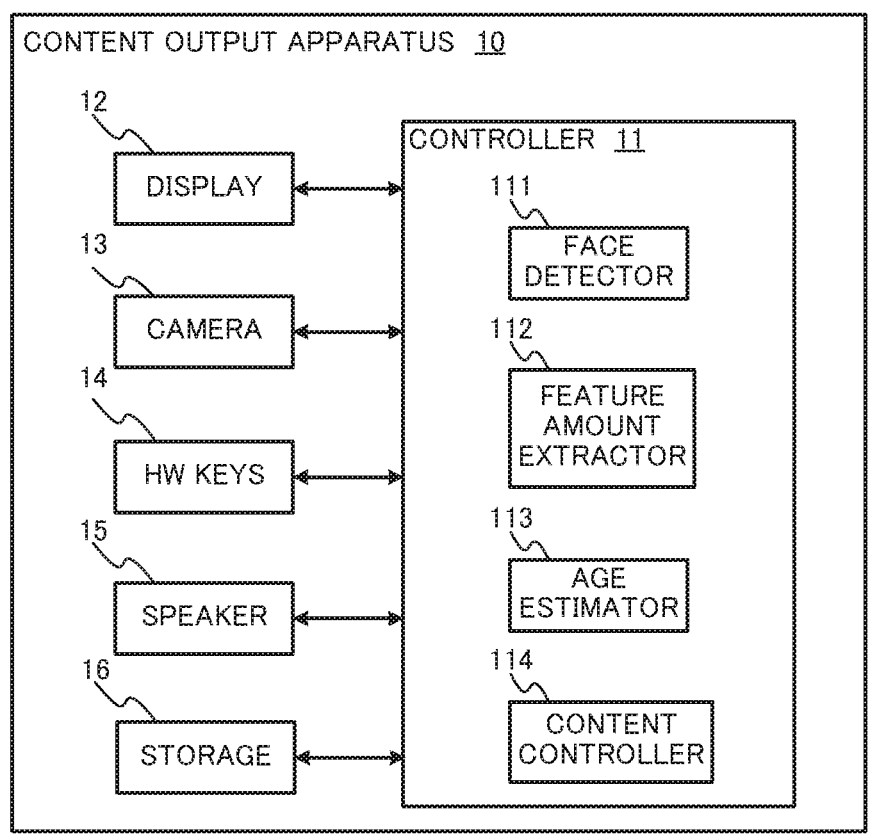
FIG. 2 is a block diagram showing a configuration of a content output apparatus according to an exemplary embodiment.

Next, a configuration of the content output apparatus 10 is explained with reference to FIG. 2. The content output apparatus 10 includes a controller 11 and a storage 16, except for those shown in FIG. 1.

The controller 11 is constituted by a CPU (Central Processing Unit), a ROM (Read Only Memory), and a RAM (Random Access Memory). The controller 11 realizes the function of each unit (a face detector 111, a feature amount extractor 112, an age estimator 113, a content controller 114), by executing a program (for example, a program related to content output control processing described later) stored in the ROM.

The storage 16 is a non-volatile storage such as a HDD (Hard Disk Drive). This storage 16 stores various types of content to be output to the display 12. This storage 16 also stores template face images, feature amounts for respective ages and the like that have been already learned and are used for face detection and age estimation described later, and the like.

Next, the function of the controller 11 is explained.

First, the face detector 111 detects a user. Specifically, the face detector 111 detects a region of a face of a user. More specifically, the face detector 111 detects a region of a face of a user shown in a live image of the camera 13. Although any methods may be used for such detection of a region of a face, one example of such methods is to identify pixels of a flesh color based on brightness, saturation, and a hue of each pixel of a user in a live image. Then, a region of a face is identified and detected by comparing the identified flesh-color pixel region, to template face images having been learned in advance. Another example of such methods is to detect a region of a face, by extracting a shape corresponding to a constituting element of a face such as a mouth or eyes of a user in a live image, and using a position of the constituting element as a reference.

Next, the feature amount extractor 112 extracts a feature of a user detected by the face detector 111. Specifically, the feature amount extractor 112 extracts a feature amount indicative of a feature of a face of a user, from the region of a face detected by the face detector 111. This feature amount is an amount to be an indicator for estimating the age from a face. As a feature amount, feature amounts for wrinkles, bags under eyes and the like that generally change as the user ages are used.

Specifically, the feature amount extractor 112 generates a feature amount for wrinkles and the like by detecting a local edge included in a region of a face by means of a method such as a Gabor filter and a LBP (Local Binary Pattern) histogram. The Gabor filter is a filter to extract directions of lines and edges included in an image. The LBP is a coding method by creating bits of 0 or 1 from the magnitude relation between a central pixel value and its peripheral pixel values. Shape information or the like of edges included in an image can be detected by using the LBP histogram.

Next, the age estimator 113 estimates an age of a user based on features (in particular feature amount in this exemplary embodiment) extracted by the feature amount extractor 112. Specifically, the age estimator 113 estimates the age by comparing the extracted feature amounts for wrinkles, bags under eyes and the like, with the feature amounts different for each age having been learned from a plurality of face images in advance. Age estimation may be performed for example by creating a database of ranges of feature amounts different for each age (from teenagers to in their sixties) in advance, and determining in which of the ranges the extracted feature amount falls.

Next, the content controller 114 controls 1) a reproduction speed of content and 2) a switching speed for switching certain content to other content, according to the age of the user estimated based on the feature amount.

With regard to 1), when the content is a moving image, the content controller 114 controls the reproduction speed for the moving image as well as the reproduction speed for the audio of the moving image, according to the estimated age. Specifically, the content controller 114 performs the above-explained control according to whether or not the estimated age is a predetermined age. Specifically, when the estimated age is 11 or above and 64 or below, the content controller 114 reproduces the moving image and the audio at a normal speed (the original reproduction speed of the moving image) (Please refer to FIG. 3A). On the other hand, when the estimated age is 65 or above or 10 or below (when the person in target is an aged person or a child), the content controller 114 performs reproduction by making the reproduction speeds for the moving image and the audio lower than the normal speed (Please refer to FIG. 3B).

With regard to 2), when the content is a menu-added advertisement, the content controller 114 controls the switching speed of menu items included in the menu-added advertisement, according to the estimated age. Specifically, the content controller 114 controls the switching speed according to whether the estimated age is a predetermined age or not.

Figure 4A:
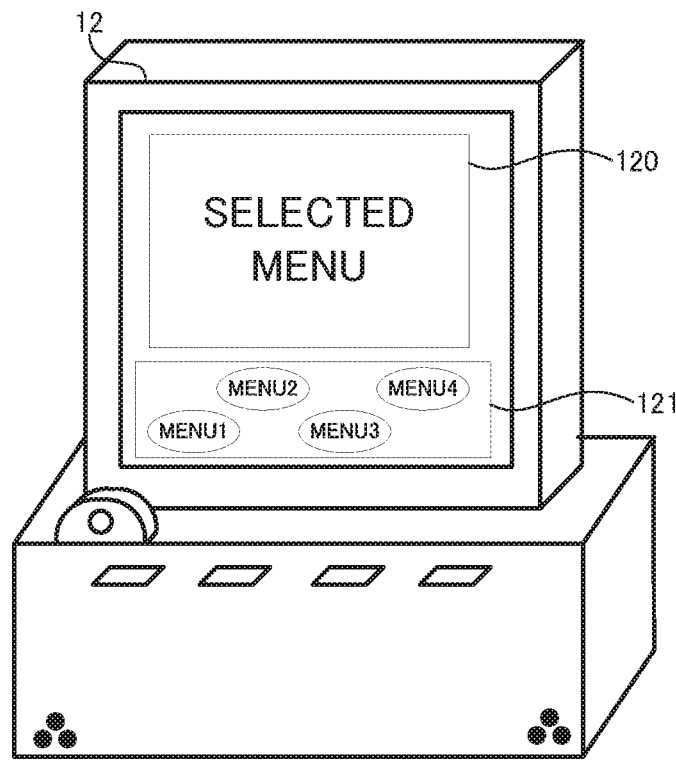
FIG. 4A is a diagram showing a state before switching menu items on a menu-added advertisement.
Figure 4B:
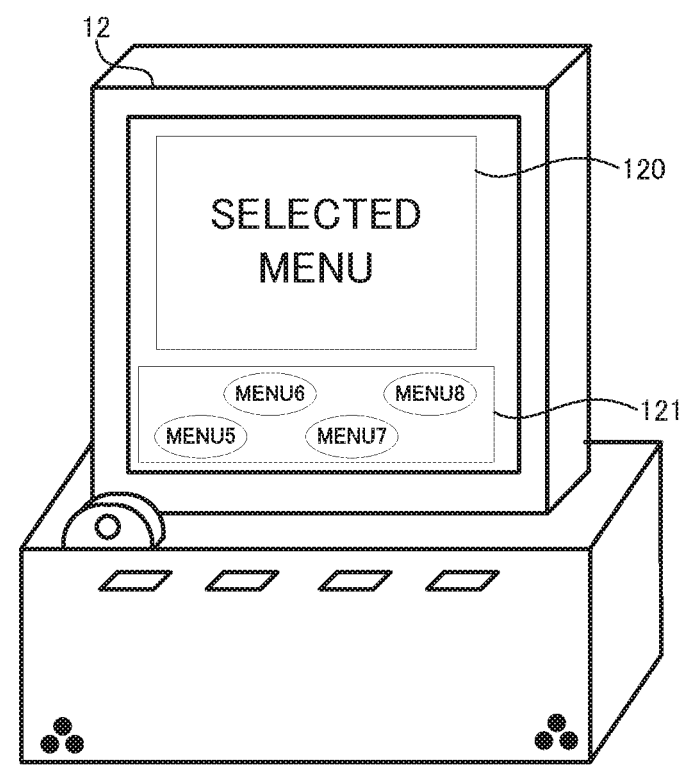
FIG. 4B is a diagram showing a state after switching menu items on a menu-added advertisement.

As shown in FIG. 4A, the menu-added advertisement is content including a menu screen 121 and an advertisement screen 120. The menu screen 121 includes menu items (Menu 1 through Menu 4) for switching between advertisements. A user switches the advertisements shown on the advertisement screen 120 by pushing HW keys 14 corresponding to Menu 1 through Menu 4 respectively, to view the advertisement the user desires. When not all the menu items can be displayed within the menu screen 121, the content controller 114 switches the menu items on a regular basis. In this exemplary embodiment, these Menu 1 through Menu 4 are switched to Menu 5 through Menu 8 on a regular basis as shown in FIG. 4B.

Here, when the estimated age is 11 or above and 64 or below, the content controller 114 switches, at a normal speed, from menu items (Menu 1 through Menu 4) in FIG. 4A to other menu items (Menu 5 through Menu 8) in FIG. 4B. On the other hand, when the estimated age is 65 or above or 10 or below (when the person in target is an aged person or a child), the content controller 114 switches, at a speed lower than the normal speed, from menu items (Menu 1 through Menu 4) in FIG. 4A to other menu items (Menu 5 through Menu 8) in FIG. 4B.

Note that when an advertisement for the menu-added advertisement in 2) is a moving image (when a moving image for the selected menu is reproduced on the advertisement screen 120), the reproduction speed of the moving image will be the reproduction speed of the above-explained 1). That is, according to the above-explained 1), the moving image on the advertisement screen 120 will be reproduced at a normal speed if the estimated age is 11 or above and 64 or below, and at a speed lower than the normal speed if the estimated age is 65 or above or 10 or below respectively.

Next, the content output control processing is explained. This content output control processing is initiated by being triggered by the power source of the content output apparatus 10 being turned ON, and the camera 13 being turned ON. Note that the explanation is based on the premise that the content is an audio-included moving image (or that the advertisement is an audio-included moving image if the advertisement is a menu-added advertisement). The content output apparatus 10 is assumed to be reproducing the moving image and the audio at an original normal speed. It is also assumed that the camera 13 is capturing the image of one user to facilitate understanding.

First, the controller 11 determines whether a user is detected (Step S11). Specifically, the controller 11 determines whether there is a user within a live image of the camera 13. Any such determination may be possible, but one example of which is to detect a user by a human detection algorithm. Specifically, determination on whether the object is a human being may be performed by determining whether or not the object is a moving body based on a distance between the objects captured in each successively captured image that constitute a live image, and by determining whether or not the moving body has a flesh color.

Note that it is not always necessary to use a camera 13 for user detection. It is also possible to use a human body sensor to determine whether there is a user around the content output apparatus 10.

Here, if a user has not been detected (Step S11: No), the content controller 114 reproduces the moving image and the audio at a normal speed (Step S16). If the moving image is a menu-added advertisement, the content controller 114 reproduces the moving images and the audio at a normal speed while switching the menu items on a regular basis at a normal speed. The controller 11 then determines whether it is the end of the moving image (Step S17), and if it is not yet the end of the moving image (Step S17: No), the controller 11 returns to Step S11. On the other hand, if it is the end of the moving image (Step S17: Yes), the controller 11 ends the processing.

In this manner, the controller 11 continues reproducing a moving image and audio at the normal speed till the end of the moving image, while no user has been detected (while "No" in Step S11).

Here, if a user is detected (Step S11: Yes), the face detector 111 detects a region of a face of the user (Step S12). This detection of a region of a face is performed by any method described above.

Next, the feature amount extractor 112 extracts a feature amount of a region of a face (Step S13). Specifically, the feature amount extractor 112 extracts a feature amount for wrinkles, bags under eyes or the like that generally change as the user ages by means of any method described above.

Next, the age estimator 113 estimates the age of the user (Step S14). Specifically, the age estimator 113 estimates the age by comparing the extracted feature amount, with feature amounts different for each age having been learned in advance, by means of any method described above.

Next, the content controller 114 determines whether the estimated age is 65 or above or 10 or below (that is, whether the user is an aged person or a child) (Step S15). When the estimated age is not 65 or above or 10 or below (that is, when the user is not an aged person or a child), (Step S15: No), the content controller 114 reproduces the moving image and the audio at the normal speed (Step S16).

Figure 3A:
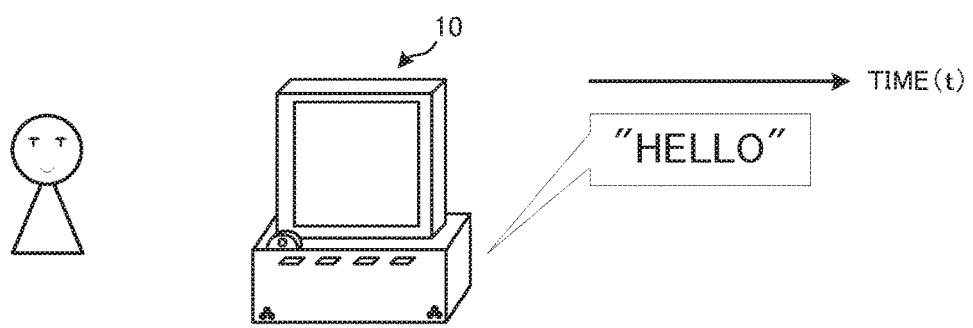
FIG. 3A is a diagram showing a content reproduction speed for adults.

Specifically, as shown in FIG. 3A, the content controller 114 reproduces the moving image and the audio ("Hello") at the original normal speed. When the moving image is a menu-added advertisement, the content controller 114, while reproducing the selected moving image at the normal speed, switches from menu items (Menu 1 through Menu 4) to other menu items (Menu 5 through Menu 8) at the normal speed (1 second for example), as shown in FIG. 4A.

On the other hand, when the estimated age is 65 or above or 10 or below (Step S15: Yes), it is determined whether or not the content is a menu-added advertisement (Step S18). If the content is not a menu-added advertisement (Step S18: No), the content controller 114 reproduces the moving image and the audio at a speed lower than the normal speed (Step S20).

Figure 3B:
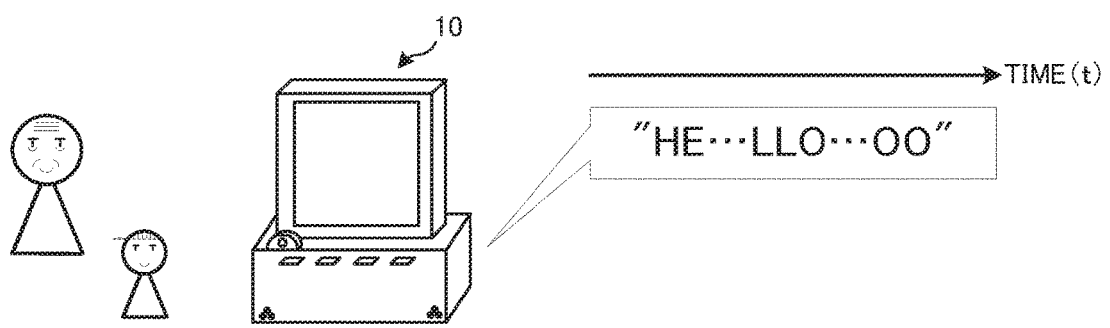
FIG. 3B is a diagram showing a content reproduction speed for elderly persons and children.

Specifically, as shown in FIG. 3B, the content controller 114 reproduces the moving image and the audio ("He . . . llo . . . oo") at a speed lower than the normal speed (two-thirds the normal speed for example).

On the other hand, when the content is a menu-added advertisement (Step S18: Yes), the content controller 114 switches the menu items at a low speed (Step S19), and reproduces the moving image for the selected menu and the audio for the moving image at a speed lower than the normal speed (Step S20).

Specifically, as shown in FIG. 4A, the content controller 114, while reproducing the moving image for the selected menu at a low speed, switches from menu items (Menu 1 through Menu 4) to other menu items (Menu 5 through Menu 8) at a lower speed that is lower than the normal speed (2 seconds for example).

After Step S16 or Step S20, the controller 11 determines whether the reproduction of the moving image is finished (Step S17), and if the reproduction of the moving image is not finished (Step S17: No), the controller 11 repeats the processing from Step S11; and if the reproduction of the moving image is finished (Step S17: Yes), the controller 11 ends the processing. In this manner, the content controller 114 controls the reproduction speed of the moving image and the audio according to the estimated age; for a menu-added advertisement, the switching speed for the menu items is also controlled in addition to the reproduction speed for the moving image. Note that the content output control processing is repeated every time the moving image is reproduced.

As in the above, the content controller 114 controls the reproduction speed of content to be output to the display 12, based on the extracted feature amount of the user's face (in this exemplary embodiment, especially according to the age estimated based on the feature amount). Therefore, it is possible to control the reproduction speed of content in accordance with the feature of the user (especially age). Therefore, content can be output so as not to cause stress for the user being the viewer.

In addition, when the estimated age is 65 or above or 10 or below, the content controller 114 reproduces the content at a speed lower than the original normal speed (for an audio-included moving image, the reproduction speed of the moving image and the audio is made lower.) For this reason, it is possible to reproduce moving images easy to view and listen to even for aged persons and children, who typically find it difficult to view moving images or listen to the audio at the original normal speed because the moving images or the audio are too fast to view or listen to.

In addition, when the estimated age is 65 or above or 10 or below, the content controller 114 sets the switching speed for switching content to other content lower than the normal speed. Specifically, when the content is a menu-added advertisement, the switching speed at which menu items are switched to other menu items is slowed. As such, such a situation can be avoided in which aged persons or children, who, when menu items are switched at a normal speed, take time to read each menu item (in practice, a title of an advertisement for each menu item and the like), cannot read the whole menu item by the time it switches instantly to another menu item.

This is the end of explanation of the exemplary embodiment. The above-explained exemplary embodiment is one example, and it is needless to say that the specific configuration of the content output apparatus 10 and the content of the content output control processing are not limited to as explained in the above exemplary embodiment.

Modification Examples

In the above-explained content output control processing, the explanation is based on the premise that the number of users captured by the camera 13 is one. However, in practice, the number of users captured by the camera 13 may be plural. In such a case, when a plurality of users are detected in Step S11, the face region detection, the feature amount extraction, and the age estimation are performed for each user in Step S12 through Step S14. In addition, in Step S15, if at least one of the users' ages is estimated to be 65 or above or 10 or below (when the camera 13 is capturing at least one aged person or child), the content controller 114 may proceed to the processing of Step S18 and therebelow, to enable reproduction of the moving image at a low speed. On the other hand, if none of the users is 65 or above or 10 or below, the content controller may proceed to the processing of Step S16 and therebelow, to enable reproduction of the moving image at a normal speed.

It is also possible to determine whether to reproduce at a low speed or not, by comparing the number of users who are 65 or above or 10 or below in age and the number of the other users at Step S15. For example, it may be possible to perform low-speed reproduction processing when the number of aged persons or children is larger than the number of the other users, and to perform normal-speed reproduction processing when the number of aged persons or children is smaller than the number of the other users. As such, reproduction processing can be flexible in accordance with the number of aged persons or children.

In addition, in the above-explained exemplary embodiment, the target of switching is assumed to be a menu item on the menu screen 121, but is not limited to such. For example, when switching content to other content (for example switching a moving image to another moving image), the switching speed may be lowered for aged persons or children. By doing so, such a situation can be avoided in which aged persons or children, who take time to understand the content of a moving image, do not understand the content (for example do not finish reading the characters in the advertisement) by the time the moving image is switched to another moving image instantly. In other words, by slowing the switching speed to other content (slowly fading out the content), it helps aged persons or children understand the content of the content before switching.

In addition, in the above-explained content output control processing, what is controlled are the reproduction speed and the switching speed of content, however is not limited to such. For example, the sound volume and frequency of audio related to content may be controlled. Specifically, the content controller 114 increases the sound volume of audio related to the content if the estimated age is 65 or above, as well as changing the high-frequency components of the audio's frequency components to the low-frequency components.

In general, as people age, they experience lowering of sensitivity in the high-frequency region, making it difficult for the aged persons to catch a high sound. Therefore, by shifting the high-frequency components (high sound) of an audio to low-frequency components (low sound), it is possible to reproduce an audio easy for aged persons to listen to. In addition, by increasing the sound volume, it is possible to reproduce an audio easy for aged persons with hearing difficulty to catch.

In addition, in the above-explained exemplary embodiment, the reproduction speed of content is controlled with reference to age as a feature of the user. However, the present disclosure is not limited to such. For example, users' expressions may be used as another reference. In such a case, the content output apparatus 10 includes an expression estimator that estimates an expression of a user based on the extracted feature amount. Then, the content controller 114 controls the reproduction speed of content in accordance with the expression estimated by the expression estimator.

For example, if the estimated expression is a disagreeable expression, it can be presumed that the user has difficulty in understanding the content. Therefore, the content controller 114 may as well make the reproduction speed of the content slower than the normal speed. Any expression estimation method may be used, but one example of which is to learn in advance the feature amounts of parts of a face characterizing each expression (for example, a feature amount when a person frowns, for a disagreeable expression), and to compare the learned feature amounts to the extracted feature amounts of the parts of a face, thereby estimating the expression. By doing so, a content's reproduction speed can be controlled in accordance with the expression of a user as a feature used instead of the age, which makes it possible to reproduce content so as not to cause stress for users.

Moreover, as a feature of a user instead of age and expression, the ethnic group of a user may be used as a reference. In such a case, the content output apparatus 10 includes an ethnic-group estimator that estimates an ethnic group of a user based on the extracted feature amount. Then, the content controller 114 controls the reproduction speed of content in accordance with the ethnic group estimated by the ethnic-group estimator. Specifically, when the estimated ethnic group is other than the Japanese, the content controller 114 may as well reproduce the content slower than the normal speed.

Any ethnic-group estimating method may be used, however one example of which is to use the color feature amount. Specifically, difference in colors for each ethnic group (for example, the color of pupil for the Occidentals, the color of skin for the Africans) is calculated in advance as a color feature amount. By creating a histogram of this color feature amount in advance by obtaining, for each ethnic group, the saturation for each hue of a region of a face (for black people, the histogram has the greatest degree of black), and selecting a histogram close to the color feature amount calculated from the region of the face, it is possible to estimate the ethnic group of a user. According to this, such content reproduction is realized as does not cause stress for users of ethnic groups other than the Japanese, who presumably have trouble understanding the Japanese (for example, have trouble understanding the Japanese characters and the Japanese audio in moving images).

In addition, in the present exemplary embodiment, for extracting the feature of a user, the face of the user is recognized. However, the present disclosure is not limited to such. It is also possible to perform user recognition or feature extraction for example by reading the membership card.

In addition, the content output apparatus 10 according to the present disclosure can be realized using a normal computer, and not using a dedicated apparatus. For example, execution of a program by a computer may realize the content output apparatus 10. A program to realize the function of the content output apparatus 10 may be stored in a computer-readable recording medium such as a USB (Universal Serial Bus) memory, a CD-ROM (Compact Disc Read Only Memory), a DVD (Digital Versatile Disc), and an HDD, or may be downloaded onto a computer through a network.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A content output apparatus comprising:
a detector for detecting a user;
an extractor for extracting a feature of the user detected by the detector;
an age estimator for estimating an age of the user based on the feature extracted by the extractor; and
a controller for controlling:
 a reproduction speed of content to be output to a display according to the age estimated by the age estimator;
 a switching speed for switching the content to other content according to the age estimated by the age estimator; and
 a switching speed for switching menu items to be output to the display to other menu items according to the age estimated by the age estimator.

2. The content output apparatus according to claim 1, wherein the controller reproduces the content at a speed lower than a predetermined speed if the age estimated by the age estimator is a first predetermined age or above or a second predetermined age or below, wherein the first predetermined age is greater than the second predetermined age.

3. The content output apparatus according to claim 1, wherein the controller controls a sound volume of an audio related to the content and a frequency of the audio if the age estimated by the age estimator is a predetermined age or above.

4. The content output apparatus according to claim 3, wherein the controller sets, to be lower than a predetermined speed, the switching speed for switching to the other content, if the age estimated by the age estimator is a first predetermined age or above or a second predetermined age or below, wherein the first predetermined age is greater than the second predetermined age.

5. A content output apparatus comprising:
a detector for detecting a user;
an extractor for extracting a feature of the user detected by the detector;
an expression estimator for estimating an expression of the user based on the feature extracted by the extractor; and
a controller for controlling:
 a reproduction speed of content to be output to a display according to the expression estimated by the expression estimator;
 a switching speed for switching the content to other content according to the expression estimated by the expression estimator; and
 a switching speed for switching menu items to be output to the display to other menu items according to the expression estimated by the expression estimator.

6. A content output apparatus comprising:
a detector for detecting a user;
an extractor for extracting a feature of the user detected by the detector;
an ethnic-group estimator for estimating an ethnic-group of the user, based on the feature extracted by the extractor; and
a controller for controlling:
 a reproduction speed of content to be output to a display according to the ethnic group estimated by the ethnic-group estimator;
 a switching speed for switching the content to other content according to the ethnic group estimated by the ethnic-group estimator; and
 a switching speed for switching menu items to be output to the display to other menu items according to the ethnic group estimated by the ethnic-group estimator.

7. The content output apparatus according to claim 6, wherein the controller reproduces the content at a speed lower than a predetermined speed, if the ethnic-group estimator estimated an ethnic group other than Japanese.

8. A content output method comprising:
a detecting step of detecting a user;
an extracting step of extracting a feature of the user detected in the detecting step;
an age estimating step of estimating an age of the user based on the feature extracted in the extracting step; and
a control step of controlling:
 a reproduction speed of content to be output to a display, according to the age estimated in the age estimating step;
 a switching speed for switching the content to other content according to the age estimated in the age estimating step; and
 a switching speed for switching menu items to be output to the display to other menu items according to the age estimated in the age estimating step.

9. A non-transitory recording medium recording therein a program that causes a computer to function as:
a detector for detecting a user;
an extractor for extracting a feature of the user detected by the detector;
an age estimator for estimating an age of the user based on the feature extracted by the extractor; and
a controller for controlling:
 a reproduction speed of content to be output to a display, according to the age estimated by the age estimator;
 a switching speed for switching the content to other content according to the age estimated by the age estimator; and
 a switching speed for switching menu items to be output to the display to other menu items according to the age estimated by the age estimator.

10. A content output method comprising:
a detecting step of detecting a user;
an extracting step of extracting a feature of the user detected in the detecting step;
an expression estimating step of estimating an expression of the user based on the feature extracted in the extracting step; and
a control step of controlling:
 a reproduction speed of content to be output to a display according to the expression estimated in the expression estimating step;
 a switching speed for switching the content to other content according to the expression estimated in the expression estimating step; and
 a switching speed for switching menu items to be output to the display to other menu items according to the expression estimated in the expression estimating step.

11. A non-transitory recording medium recording therein a program that causes a computer to function as:

a detector for detecting a user;
an extractor for extracting a feature of the user detected by the detector;
an expression estimator for estimating an expression of the user based on the feature extracted by the extractor; and
a controller for controlling:
- a reproduction speed of content to be output to a display according to the expression estimated by the expression estimator;
- a switching speed for switching the content to other content according to the expression estimated by the expression estimator; and
- a switching speed for switching menu items to be output to the display to other menu items according to the expression estimated by the expression estimator.

12. A content output method comprising:
a detecting step of detecting a user;
an extracting step of extracting a feature of the user detected in the detecting step;
an ethnic-group estimating step of estimating an ethnic-group of the user based on the feature extracted in the extracting step; and
a control step of controlling:
- a reproduction speed of content to be output to a display according to the ethnic group estimated in the ethnic-group estimating step;
- a switching speed for switching the content to other content according to the ethnic group estimated in the ethnic-group estimating step; and
- a switching speed for switching menu items to be output to the display to other menu items according to the ethnic group estimated in the ethnic-group estimating step.

13. A non-transitory recording medium recording therein a program that causes a computer to function as:
a detector for detecting a user;
an extractor for extracting a feature of the user detected by the detector;
an ethnic-group estimator for estimating an ethnic-group of the user based on the feature extracted by the extractor; and
a controller for controlling:
- a reproduction speed of content to be output to a display according to the ethnic group estimated by the ethnic-group estimator;
- a switching speed for switching the content to other content according to the ethnic group estimated by the ethnic-group estimator; and
- a switching speed for switching menu items to be output to the display to other menu items according to the ethnic group estimated by the ethnic-group estimator.

14. The content output apparatus according to claim 1,
wherein the detector detects a region of a face of the user, and
wherein the extractor extracts the feature of the user from the region of the face detected by the detector.

15. The content output apparatus according to claim 5,
wherein the detector detects a region of a face of the user, and
wherein the extractor extracts the feature of the user from the region of the face detected by the detector.

16. The content output apparatus according to claim 6,
wherein the detector detects a region of a face of the user, and
wherein the extractor extracts the feature of the user from the region of the face detected by the detector.

* * * * *